US006793378B2

(12) United States Patent
Wu

(10) Patent No.: US 6,793,378 B2
(45) Date of Patent: Sep. 21, 2004

(54) DO-IT-YOURSELF LAMP STRUCTURE

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 7 days.

(21) Appl. No.: 10/277,667

(22) Filed: Oct. 23, 2002

(65) Prior Publication Data

US 2004/0080955 A1 Apr. 29, 2004

(51) Int. Cl.7 .................................................. B60Q 1/00
(52) U.S. Cl. ....................... 362/365; 362/147; 362/343; 362/145; 362/406; 248/344; 439/699.1; 439/699.2
(58) Field of Search ................................ 362/365, 147, 362/581, 343, 145, 226, 405, 406; 248/344; 439/699.1, 699.2

(56) References Cited

U.S. PATENT DOCUMENTS 6,502,966 B1 * 1/2003 Wu ............................ 362/365

* cited by examiner

*Primary Examiner*—Stephen Husar
*Assistant Examiner*—Bertrand Zeade

(74) *Attorney, Agent, or Firm*—Troxell Law Office PLLC

(57) ABSTRACT

The present invention relates to an improved do-it-yourself lamp structure, comprising of a socket disposed on the bottom of an inner side of a through hole on a wire connection box and a lamp rod with its front end passing through the through hole and being plugged into the socket; wherein the top end of the lamp rod being externally connected to a fixed base, and the front edge of the bottom of the fixed base having an inserting section corresponsive to its insertion into the socket, and a curved groove is disposed at a side of the fixed base, and an embedding bracket with a shape corresponsive to the shape of the curved groove is disposed on the curved groove. The embedding bracket inclines towards its top from both ends, and a blocking member is disposed at the inclined end of the top such that the embedding bracket has a blocking member at its top and both ends of the embedding bracket are attached onto the curved groove with a structure being slightly protruded from the middle section of. After the top end of the insertion section of the lamp rod is inserted into the through hole of the wire connection box in advance, the lamp rod is pulled downward so that the insertion section of the lamp rod aligns with the socket of the wire connection box and the blocking member is latched into the through hole. Therefore, the lamp rod and wire connection box can be stored separately to reduce the volume for transportation, and the user only has to insert the lamp rod into the lamp base to accomplish the convenient DIY assembling.

3 Claims, 4 Drawing Sheets

DO-IT-YOURSELF LAMP STRUCTURE

BACKGROUND OF THE INVENTION

1. Field of the Invention

An improved do-it-yourself lamp structure comprises a curved groove disposed at a side of a fixed base, and an embedding bracket with a shape corresponsive to the shape of the curved groove disposed on the curved groove; the embedding bracket inclines towards its top from both ends, and a blocking member is disposed at the inclined end of the top such that the embedding bracket has a blocking member at its top, and both ends of the embedding bracket are attached onto the curved groove with a structure being slightly protruded from the middle section. After the top end of the insertion section of the lamp rod is inserted into the through hole of the wire connection box in advance, the lamp rod is pulled downward such that the insertion section of the lamp rod aligns with the socket of the wire connection box and the blocking member is latched into the through hole. Therefore, the lamp rod and the wire connection box can be stored separately to reduce the volume for transportation, and the user just needs to insert the lamp rod into the lamp base for a convenient DIY assembling.

2. Description of the Related Art

The assembling of the conventional lamp structure regardless of wall lamp, table lamp, or floor lamp, generally uses screw bolts and nuts for fixing, but such assembling method of using bolts and nuts may collide and damage the finished goods during the assembling, and it also requires tools (such as wrench and screwdriver) for assembling the lamp. The friction produced during the assembling may easily damage and expose the electric wire and thus may have a risk of electric shocks. All these factors cause trouble to the assembling and the traditional method is not suitable for DIY assembling. Manufacturers have to connect the lamp rod with the wire connection box before selling the product, which will increase the volume for transportation and in turn increase the cost. In view of the aforementioned shortcomings, the inventor of the present invention based on years of experience accumulated from the engagement in the related industry conducted extensive research to resolve the aforementioned shortcomings and invented the present invention.

SUMMARY OF THE INVENTION

The primary objective of the present invention is to provide an improved do-it-yourself lamp structure, applicable for all kinds of lamps such as chandelier, ceiling lamp, wall lamp, table lamp, and floor lamp, and comprising a socket disposed on the bottom of an inner side of a through hole on a wire connection box and a lamp rod with its front end passing through the through hole and being plugged into the socket; wherein the top end of the lamp rod being externally connected to a fixed base, and the front edge of the bottom of the fixed base having an inserting section corresponsive to its insertion into the socket, and a curved groove is disposed at a side of the fixed base, and an embedding bracket with a shape corresponsive to the shape of the curved groove is disposed on the curved groove. The embedding bracket inclines towards its top from both ends, and a blocking member is disposed at the inclined end of the top such that the embedding bracket has a blocking member at its top and both ends of the embedding bracket are attached onto the curved groove with a structure being slightly protruded from the middle section. After the top end of the insertion section of the lamp rod is inserted into the through hole of the wire connection box in advance, the lamp rod is pulled downward so that the insertion section of the lamp rod aligns with the socket of the wire connection box and the blocking member is latched into the through hole. The lamp rod can be securely latched into the wire connection box so that the wire connection box and the lamp rod can be electrically coupled.

Another objective of the present invention is to provide an improved do-it-yourself lamp structure, such that the lamp rod and the wire connection box of the lamp can be separated during the packaging, transportation, and storage of the lamp, and thus can reduce the volume for transportation and storage. When the user has bought the lamp, the user just needs to insert the insertion section of the lamp rod into the socket of the wire connection box without using any tool and thus provide a convenient way for the DIY assembling.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENTS

Figure 1:
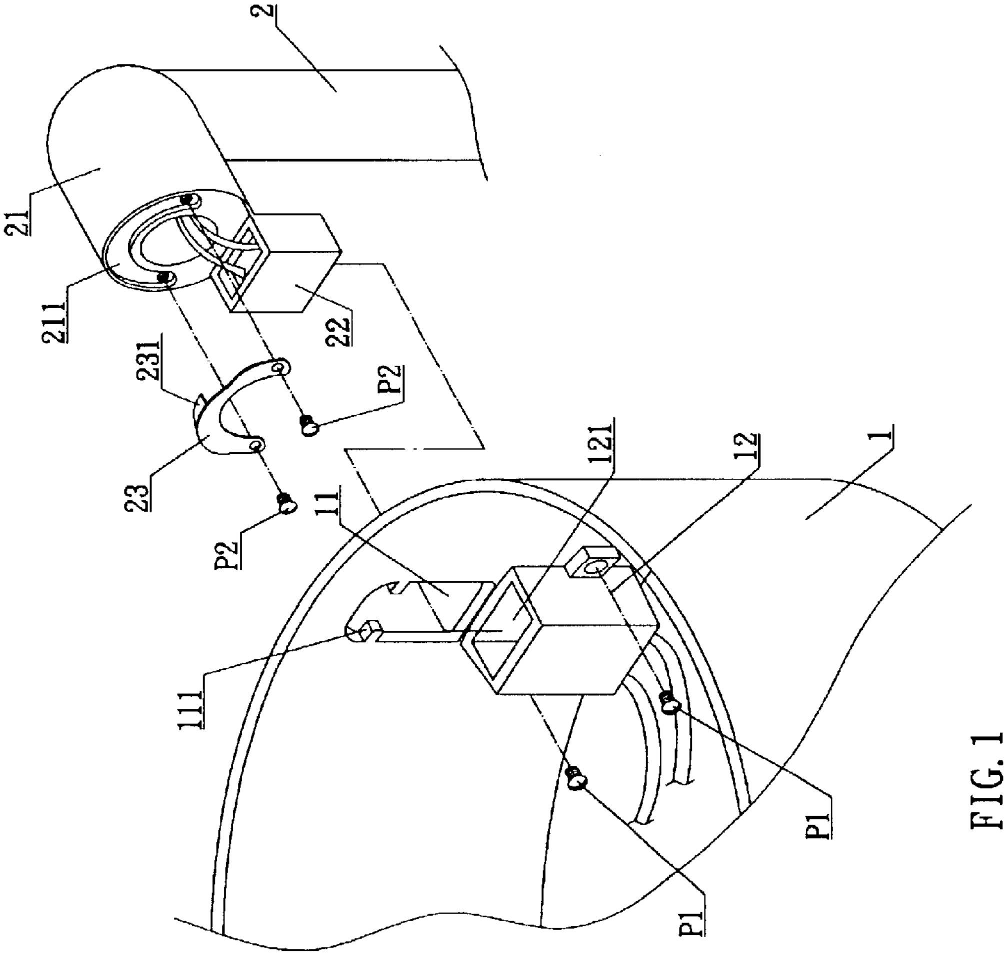
FIG. 1 is an explosive diagram of the present invention.
Figure 2:
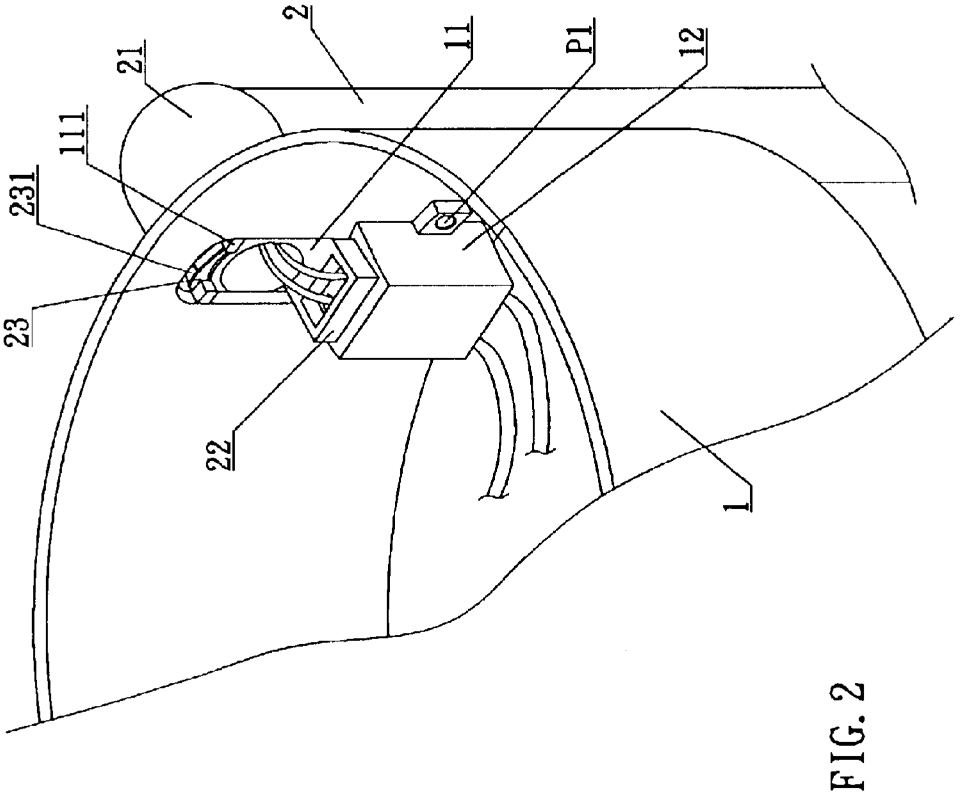
FIG. 2 is an assembled diagram of the present invention.

Please refer to FIGS. 1 and 2 for a clear understanding of the structure and mode of the present invention. The improved do-it-yourself lamp structure of the present invention comprises a wire connection box 1 having a through hole 11 on its side and lamp rod 2 with its front end passing through the through hole 11 and being plugged inside the wire connection box 1; wherein a blocking member 111 is located on each of two opposing sides on a top surface of the through hole 11 of the wire connection box 1, and a socket 12 is secured onto the bottom of an inner side of the through hole 11 of the wire connection box 1 by screws, and the socket 12 has an insert hole 121 in its middle. The lamp rod 2 has a socket 22 with an insertion section externally connected to a fixed base 21, and the insertion section 22 extends from a front edge of the bottom of the fixed base 21 and corresponds to an insert hole 121 on the socket. A curved groove 211 is disposed at a side of the fixed base 21, and an embedding bracket 23 with a shape corresponsive to the shape of the curved groove 211 is disposed on the curved groove 211. The embedding bracket 23 inclines towards its top from both ends, and a blocking member 231 is disposed at the inclined end of the top such that the embedding bracket 23 has a blocking member at its top and both ends of the embedding bracket are secured by screws to the curved groove with a structure being slightly protruded from the middle section.

Figure 3A:
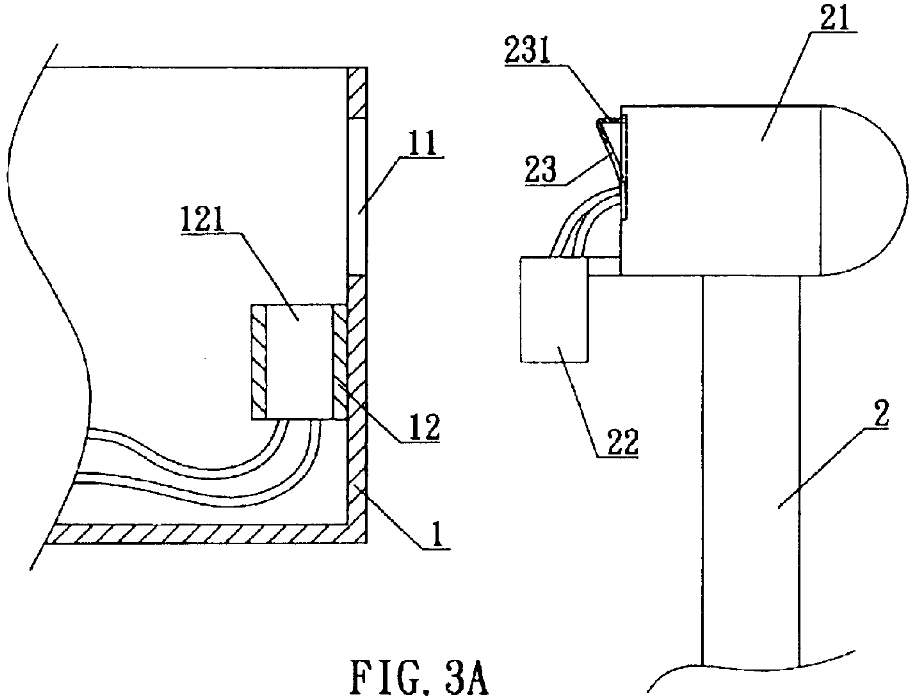
FIG. 3A is a cross-sectional diagram of the lamp of the present invention before inserting the lamp rod into the lamp base.
Figure 3B:
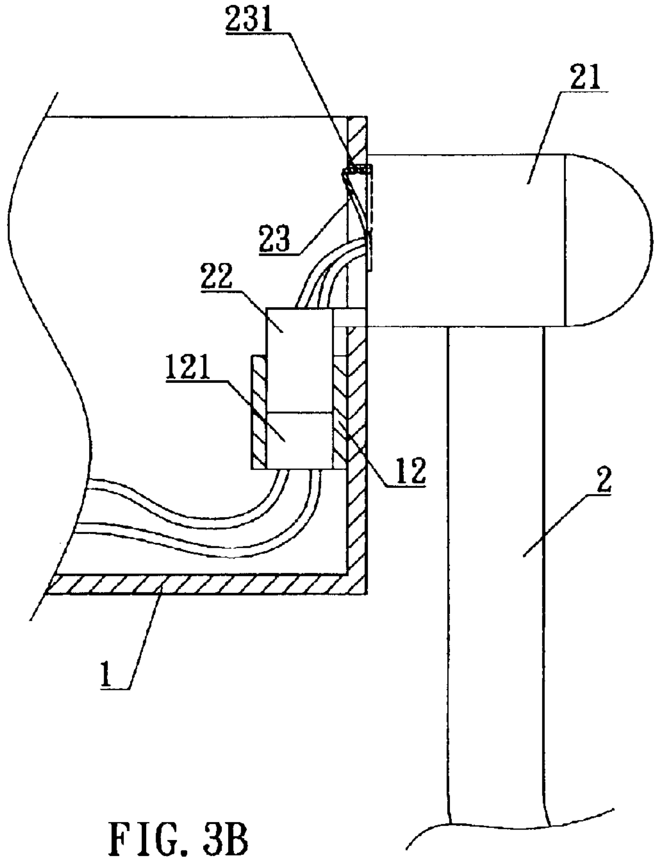
FIG. 3B is a cross-sectional diagram of the lamp of the present invention after inserting the lamp rod into the lamp base.

Please refer to FIG. 3 for its movement. The way of the electric conduction between the lamp rod 2 and the wire connection box 1 is by means of inserting the top end of the insertion section 22 of the lamp rod 2 into the through hole 11 of the wire connection box 1 in advance, and then pulling the lamp rod 2 downward so that the insertion section 22 of the lamp rod 1 aligns with the socket 12 of the wire connection box 1 and embedding bracket secured on the fixed base 21 with its blocking member 231 is latched into the upper edge of the through hole by the pressure exerted from the fixed base 21 and the periphery of the wire connection box 1. The blocking member slides along the external periphery of the wire connection box 1 and down into the through hole 11 of the wire connection box 1 emerging from the top edge of the through hole 11 to latch into the top edge of the through hole 11. The lamp rod 2 can be securely latched with the wire connection box 1 so that the wire connection box 1 and the lamp rod 2 can be electrically coupled.

Figure 4:
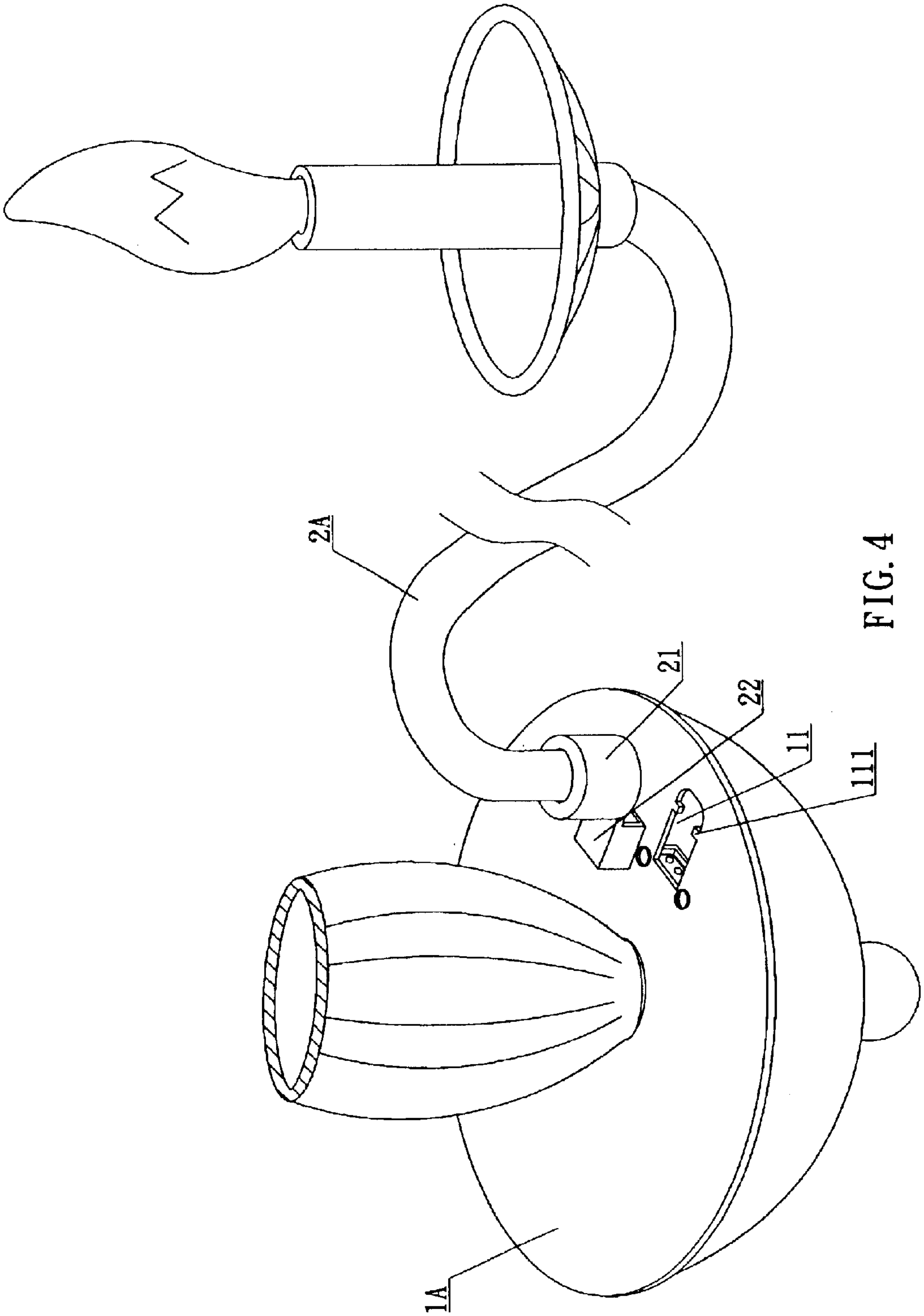
FIG. 4 is a diagram of another preferred embodiment of the present invention

Please refer to FIG. 4 for the diagram of another preferred embodiment of the assembling. The insertion section 22 of the lamp rod 2A passes through the through hole 11 at the top of the wire connection box 1A. Similarly, the lamp rod 2A is fixed on the wire connection box 1A to electrically connect the lamp rod and the wire connection box.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connector for a do-it-yourself lamp structure comprising:

a) a wire connection box having;
  i) a hole; and
  ii) a first socket having an insert hole and connected to the wire connection box adjacent to the hole; and b) a lamp rod having:
  i) a fixed base located on an end thereof;
  ii) a second socket connected to a first edge of a front of the fixed base and inserted into the insert hole of the first socket; and
  iii) an embedding bracket having a blocking member and connected to a second edge of the front of the fixed base, the embedding bracket being inserted into the hole of the wire connection box, the blocking member frictionally engaging an edge of the hole.

2. The connector according to claim 1, wherein the hole includes two blocking members located on opposing edges of the hole and located on the hole opposite the first socket.

3. The connector according to claim 1, wherein the fixed base includes a curved groove located on the second edge of the front thereof, the embedding bracket having a shape corresponding with and being aligned with the curved groove.

* * * * *